US011922354B2

(12) United States Patent
Alexander et al.

(10) Patent No.: US 11,922,354 B2
(45) Date of Patent: Mar. 5, 2024

(54) SYSTEMS AND METHODS FOR ANALYZING DATA SOURCES FOR EVALUATING ORGANIZATIONAL EFFICIENCY

(71) Applicant: JPMORGAN CHASE BANK, N.A., New York, NY (US)

(72) Inventors: Shawn Wesley Alexander, Pearland, TX (US); Daniel D. McQuiston, West Chester, PA (US); Eric Han Kai Chang, Wilmington, DE (US); James P. White, III, Middletown, DE (US); Erin Michelle Perry, Townsend, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 9 days.

(21) Appl. No.: 16/951,597

(22) Filed: Nov. 18, 2020

(65) Prior Publication Data

US 2021/0158258 A1    May 27, 2021

Related U.S. Application Data

(60) Provisional application No. 62/939,365, filed on Nov. 22, 2019.

(51) Int. Cl.
*G06Q 10/06* (2023.01)
*G06Q 10/0637* (2023.01)
(Continued)

(52) U.S. Cl.
CPC ....... *G06Q 10/06375* (2013.01); *G06N 5/041* (2013.01); *G06N 20/00* (2019.01); *G06Q 10/06315* (2013.01)

(58) Field of Classification Search
CPC ....... G06Q 10/06375; G06Q 10/06315; G06N 20/00; G06N 5/041
See application file for complete search history.

(56) References Cited

U.S. PATENT DOCUMENTS 7,277,825 B1 * 10/2007 Orfali ................. G06F 11/3447
702/182
10,262,154 B1 * 4/2019 Kenthapadi ......... G06F 21/6227
(Continued)

FOREIGN PATENT DOCUMENTS

CA         3050005 A1 *  7/2018  ............. G06F 40/30
WO    WO-2014194002 A1 * 12/2014  ........... G06N 99/005

OTHER PUBLICATIONS https://hbr.org/2017/08/what-we-learned-about-bureaucracy-from-7000-hbr-readers (hereinafter Hamel). (Year: 2017).*

(Continued)

*Primary Examiner* — Hamzeh Obaid
(74) *Attorney, Agent, or Firm* — GREENBERG TRAURIG LLP

(57) ABSTRACT

Systems and methods for determining the efficiency of an organization by analyzing data feeds from various applications are disclosed. According to one embodiment, in an information processing apparatus comprising at least one computer processor a method for measuring efficiency may include: (1) receiving, from an enterprise software program, raw data related to an entity's performance; (2) calculating a plurality of efficiency metrics based on the raw data; (3) identifying a recommended action based on one of the efficiency metrics; and (4) automatically implementing the recommended action.

15 Claims, 5 Drawing Sheets

(51) Int. Cl.
　　　*G06N 5/04*　　　(2023.01)
　　　*G06N 20/00*　　(2019.01)
　　　*G06Q 10/0631*　(2023.01)

(56) References Cited

U.S. PATENT DOCUMENTS

| | | | | |
|---|---|---|---|---|
| 10,592,525 | B1* | 3/2020 | Khante | G06F 16/258 |
| 2006/0190310 | A1* | 8/2006 | Gudla | G06Q 10/04 |
| | | | | 705/7.11 |
| 2008/0016490 | A1* | 1/2008 | Pabalate | G06Q 10/10 |
| | | | | 717/100 |
| 2014/0136456 | A1* | 5/2014 | Susarla | G06N 20/00 |
| | | | | 706/12 |
| 2015/0193709 | A1* | 7/2015 | Ramesh Babu | G06Q 10/0637 |
| | | | | 705/7.28 |
| 2016/0267412 | A1* | 9/2016 | Reed | G06Q 10/06313 |
| 2019/0155591 | A1* | 5/2019 | Kumar | G06F 11/34 |
| 2019/0317754 | A1* | 10/2019 | Mosquera | H04L 51/02 |
| 2020/0005667 | A1* | 1/2020 | Baker | G09B 19/00 |
| 2020/0372075 | A1* | 11/2020 | Rogynskyy | H04L 51/48 |
| 2021/0027231 | A1* | 1/2021 | Ruble | G06Q 10/06393 |

OTHER PUBLICATIONS

Karuna, P., M. G. Divya, and N. Mangala. "Statistical analysis of metrics for software quality improvement." International Journal of Software Engineering & Application (IJSEA) 9.1 (2018): 77-88. (Year: 2018).*

* cited by examiner

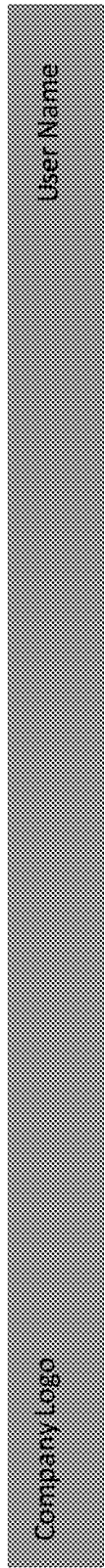

| Organization | LOB | | | | | | |
|---|---|---|---|---|---|---|---|
| | | Bloat | Friction | Insularity | Dis-empowerment | Risk Aversion | Politics | Inertia |
| GTI | George Sherman | 10% | 60% | 20% | 10% | 30% | 65% | 20% |

154

Summary

Bloat – Organization is at a decent size given the complexity and location strategy
Friction – Has increased over the last quarter; making it more difficult to deliver value to the business (see Recommendations)
Insularity – Remained constant; does not require attention
Dis-empowerment – Remained constant, should seek ways to improve (see Recommendations)
Risk Aversion – Increasing, which drives down innovation (see Recommendations)
Politics – Increasing with recent reorganizations; stifles new work and ability to get things done (see Recommendations)
Inertia – Improving; continue with previous recommendations

FIG. 3

SYSTEMS AND METHODS FOR ANALYZING DATA SOURCES FOR EVALUATING ORGANIZATIONAL EFFICIENCY

RELATED APPLICATIONS

This application claims priority to, and the benefit of, U.S. Provisional Patent Application Ser. No. 62/939,365, filed Nov. 22, 2019, the disclosure of which is hereby incorporated, by reference, in its entirety.

BACKGROUND OF THE INVENTION

1. Field of the Invention

Embodiments generally relate to systems and methods for determining the efficiency of an organization by analyzing data feeds from various applications.

2. Description of the Related Art

An organization may be made up of a hierarchical structure, dividing individuals into different teams, groups, or sub-organizations. In addition, the organization may be divided across different lines of business. The greater the number of people within an organization, the larger the impact bureaucracy has on the organization's efficiency. There is not a way to measure, visualize, and address bureaucracy. There are no known systems to programmatically measure and resolve bureaucracy issues in organizations.

SUMMARY OF THE INVENTION

Systems and methods for determining the efficiency of an organization by analyzing data feeds from various applications are disclosed. According to one embodiment, in an information processing apparatus comprising at least one computer processor a method for measuring efficiency may include: (1) receiving, from an enterprise software program, raw data related to an entity's performance; (2) calculating a plurality of efficiency metrics based on the raw data; (3) identifying a recommended action based on one of the efficiency metrics; and (4) automatically implementing the recommended action.

In one embodiment, the efficiency metric may include at least one of a disempowerment efficiency metric, a bloat efficiency metric, a politics efficiency metric, an inertia efficiency metric, a risk aversion efficiency metric, an insularity efficiency metric, and a friction efficiency metric.

In one embodiment, the method may further include graphically presenting at least one of the efficiency metrics with a trend indicator based on at least a prior efficiency metric. In one embodiment, the trend indicator may include an arrow.

In one embodiment, the method may further include graphically presenting at least one of the efficiency metrics with a comparison to an efficiency metric for a similarly situated entity.

In one embodiment, the raw data may include at least one of a number of direct reports for managers, a number of approvers in an approval chain, an average tenure for a manager, an amount of personnel change, an age of hardware infrastructure, and an amount of time spent on internal meetings.

In one embodiment, the step of automatically implementing the recommended action may include communicating the recommended action to the enterprise software program, whereby the enterprise software program implements the recommended action.

In one embodiment, the recommended action may include limiting a number of meetings, updating hardware infrastructure, changing an email filtering parameter, etc. The recommended action may be identified using a trained machine learning model.

In one embodiment, the method may further include receiving, from the enterprise software program, updated raw data related to the entity's performance following the implementation of the recommended action; re-calculating the one efficiency metric; and updating a recommended action database based on the recommended action and the calculated and re-calculated efficiency metric.

In one embodiment, at least one of the plurality of efficiency metrics may be calculated by applying weightings to the raw data.

In one embodiment, the weightings are selected using a trained machine learning model.

In one embodiment, the enterprise software program may include an approval system, a human resources (HR) system, an email system, a document storage system, and a calendar or scheduler system.

In one embodiment, the method may further include generating hypothetical raw data for a hypothetical change; calculating a hypothetical efficiency metric based on the hypothetical change; and graphically presenting the efficiency metric and the hypothetical efficiency metric.

According to another embodiment, a system for measuring efficiency may include an enterprise software program and a computing system comprising at least one computer processor and executing a computer program. The computer program may receive, from the enterprise software program, raw data related to an entity's performance; may calculate a plurality of efficiency metrics based on the raw data, wherein the efficiency metrics comprise at least one of a disempowerment efficiency metric, a bloat efficiency metric, a politics efficiency metric, an inertia efficiency metric, a risk aversion efficiency metric, an insularity efficiency metric, and a friction efficiency metric; may identify a recommended action based on one of the efficiency metrics; and may automatically implement the recommended action.

In one embodiment, the computer program may output a graphical representation of at least one of the efficiency metrics with a trend indicator based on at least a prior efficiency metric.

In one embodiment, the enterprise software program may include an approval system, a human resources (HR) system, an email system, a document storage system, and a calendar or scheduler system.

In one embodiment, the system may further include a trained recommended action machine learning model, and the computer program may identify the recommended action using the trained machine learning model.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts an example of a graphical user interface according to one embodiment.

DETAILED DESCRIPTION OF PREFERRED EMBODIMENTS

Figure 1:
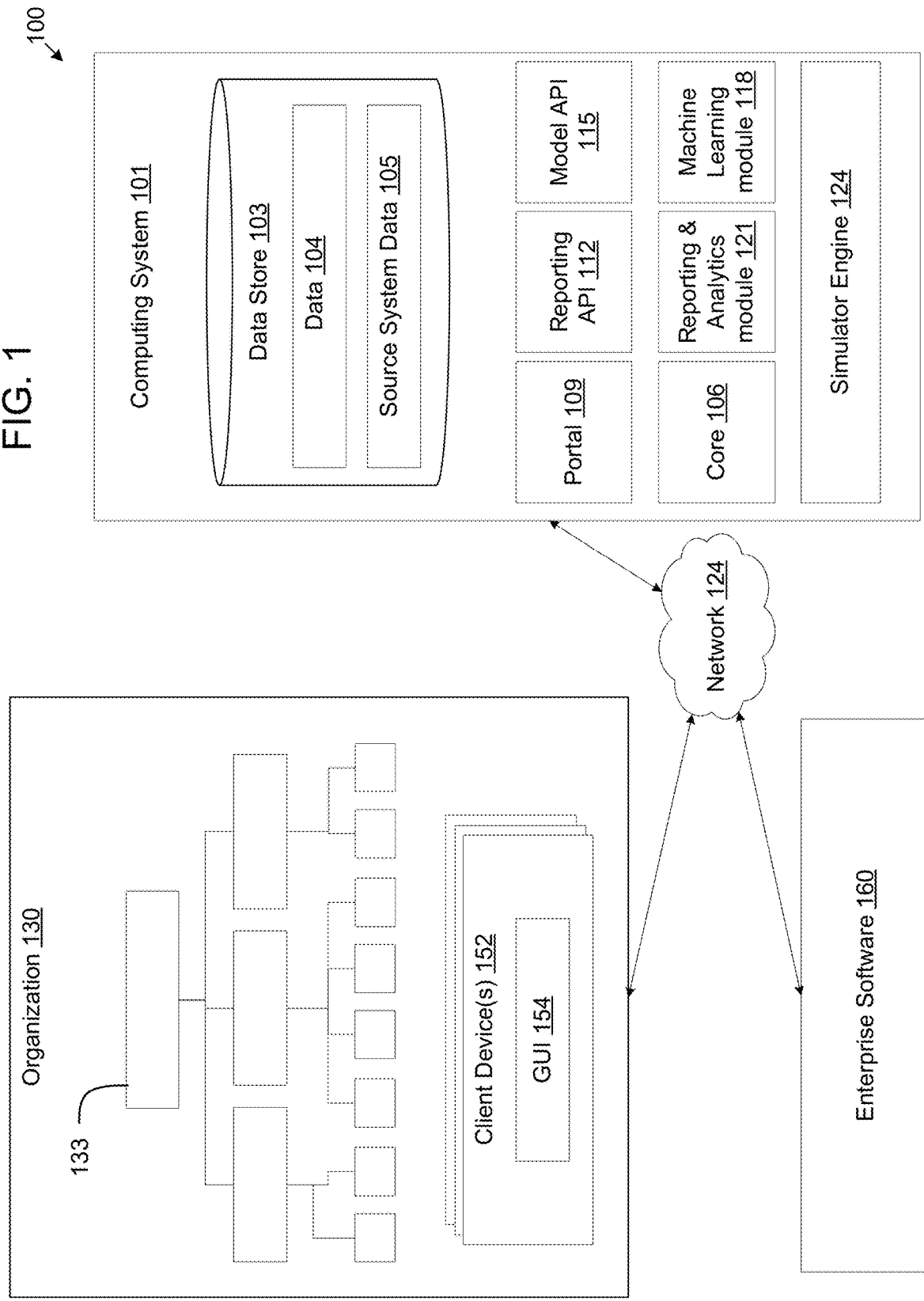
FIG. 1 depicts a system for determining the efficiency of an organization by analyzing data feeds from various applications according to one embodiment.

Embodiments generally relate to systems and methods for quantifying an organization's bureaucracy based on analyzing data sources originating from an organization's software tools.

Some embodiments are directed to using application programming interfaces (APIs) to extract data from an organization's enterprise level software applications, analyze it to generate various efficiency metrics, such as Bureaucracy Measurement Indices (BMIs), and render a dynamic interface for allowing an organization to view the efficiency metrics for different tiers within a hierarchical organization.

Some embodiments are directed to simulating scenarios to evaluate how a policy change would affect one or more efficiency metrics.

Some embodiments are directed to accessing enterprise level software to affect a policy change based on one or more efficiency metrics.

Embodiments are directed to measuring, visualizing, and addressing bureaucracy to deliver value or correct issues such as technical debt. To quantify bureaucracy, several efficiency metrics may be used, including disempowerment, bloat, politics, inertia, risk aversion, insularity, and friction. The efficiency metrics may be calculated based on data that may be retrieved from enterprise software.

Each efficiency metric may be broken down into a model that describes its impact on the organization. For example:

"Disempowerment" relates to elements such as the amount of time employees are allowed to innovate, how much push back and autonomy people have to change direction, how much input they have into the ultimate deliverables;

"Bloat" relates to elements such as the size of organizations, how much they grow over time, number of management layers between doers and decision makers, number of approvals required to complete tasks;

"Politics" relates to elements such as approvals required to create a new application or deliver a new feature functionality, lead time from need to fulfillment of resources required to deliver value, management change over time, tenure of manager with their management chain, turnover of a management chain over time;

"Friction" relates to elements such as the time to approve requests for access, time to market from idea to production, time to acquire servers and required infrastructure, number of requests required to deliver production functionality;

"Risk aversion" relates to elements such as how often applications and feature functionality are released, how often are aging applications retired, how often are technology stacks updated, age of open source components, how innovative are organizations with things such as new patents, inventions, how often new technologies are introduced;

"Insularity" relates to elements such as a lack of interest or lack of taking on responsibilities outside of a core competency; and "Inertia" relates to elements such as how difficult it is to change a direction once a decision has been made, how late are new defects or problems identified in the development life cycle, how long problematic applications and releases continue before they are cancelled to be rethought and re-planned.

Other efficiency metrics may be used as is necessary and/or desired.

FIG. 1 illustrates a networked environment 100 according to embodiments. The networked environment 100 may include a computing system 101 that may include a combination of hardware and software. The computing system 101 may include a data store 103. The data store 103 stores data such as, for example, data relating to efficiency metrics 104, source system data 105, and other data. The computing system 101 may include several executable software programs such as, for example, a core 106, a portal 109, a reporting application program interface (API) 112, a model API 115, a machine learning module 118, a reporting and analytics module 121, and a simulator engine 124.

The computing system 101 may be connected to a network 124 such as the Internet, intranets, extranets, wide area networks (WANs), local area networks (LANs), wired networks, wireless networks, or other suitable networks, etc., or any combination of two or more such networks.

The computing system 101 may include, for example, a server computer or any other system providing computing capability. Alternatively, the computing system 101 may employ a plurality of computing devices that may be arranged, for example, in one or more server banks, computer banks or other arrangements. Such computing devices may be located in a single installation, or they may be distributed among many different geographical locations. For example, the computing system 101 may include a plurality of computing devices that together may comprise a hosted computing resource, a grid computing resource and/or any other distributed computing arrangement. In some cases, the computing system 101 may correspond to an elastic computing resource where the allotted capacity of processing, network, storage, or other computing-related resources can vary over time. The computing system 101 may implement one or more virtual machines that use the resources of the computing system 101.

The computing system 101 may include physical servers and/or cloud-based computing systems.

Applications and/or other functionality may be executed by the computing system 101 according to various embodiments. Also, various data may be stored in the data store 103 or other memory that is accessible to the computing system 101. The data store 103 may be implemented as a database or storage device.

As mentioned above, the components executed on the computing system 101 may access, modify, and/or generate the contents of the data store 103.

The core 106 may be a module that takes data from upstream data feeds. The core 106 may perform extract, transform, and load (ETL) processes, data verification and validation. The core 106 may store resulting data such as, for example, source system data 105, in the data store 103.

The portal 109 may generate and/or provide a graphic user interface (GUI). The portal may generate web-based documents for rendering a GUI. Such documents may be hypertext markup language (HTML) documents dynamic HTML documents, extended markup language (XML)

documents, or any other documents or data that may be decoded and rendered to present data to a user. The portal 109 may provide a data visualization of an efficiency metric model, allowing users to search through various organizational layers and view efficiency metric scores at each one of those levels. This may facilitate navigation through the organizational structure and view data 104 across multiple sub-organizations. Users may also be able to compare data 104 across multiple sections of the organization.

The reporting API 112 may provide an entry point for external callers that wish to access the data visualized in the GUI from a microservice based API directly. The model API 115 allows administrators to load machine learning (ML) models at runtime directly to the ML module 118 and switch between model versions at runtime. The ML module 118 may analyze data in the warehouse to infer insights into organizational efficiency metrics. The reporting and analytics module 121 may generate reports on an ad-hoc or scheduled basis and update the transactional view.

The simulator engine 124 may take insights from the ML module 118 and information from the data store 103 and may perform educated simulations of the impact that a hypothetical change to the organization may have on organization's efficiency metrics (e.g., shifting teams to a different manager).

The networked environment 100 may also include, be associated with, or be part of an organization 130. An organization may be a business that is arranged in a hierarchy 133. The hierarchy 133 structures the organization into sub-organizations, groups, and teams down into individual people. The hierarchy 133 may be based according to various lines of business (LOBs), functionality teams such as engineering, IT, product, marketing, legal, or any other suitable organization. An organization's hierarchy may be represented as data stored in the data store 103.

An organization 130 may typically be made up of individuals that use client devices 152. A client device 152 allows a user to interact with the components of the computing system 101 over a network 124. Client devices 152 may include, for example, a smart phone, computer (e.g., workstation, desktop computer, laptop computer, tablet computer, etc.), an Internet of Things (IoT) appliance, etc. The client device 152 may include an application such as a web browser or mobile application that communicates with the portal to receive data for rendering a GUI 154. For example, a browser or dedicated application may be used by the client device 152 to communicate with the portal 109 for rendering the GUI 154.

In addition, an organization 130 may use various enterprise software 160 to carry out its operations. Enterprise software 160 may include software as a service (SaaS) services, cloud-based solutions, or locally installed software residing within a private or hybrid cloud managed by the organization. Enterprise software 160 may also be at least partially installed on a client device 152.

Figure 2:
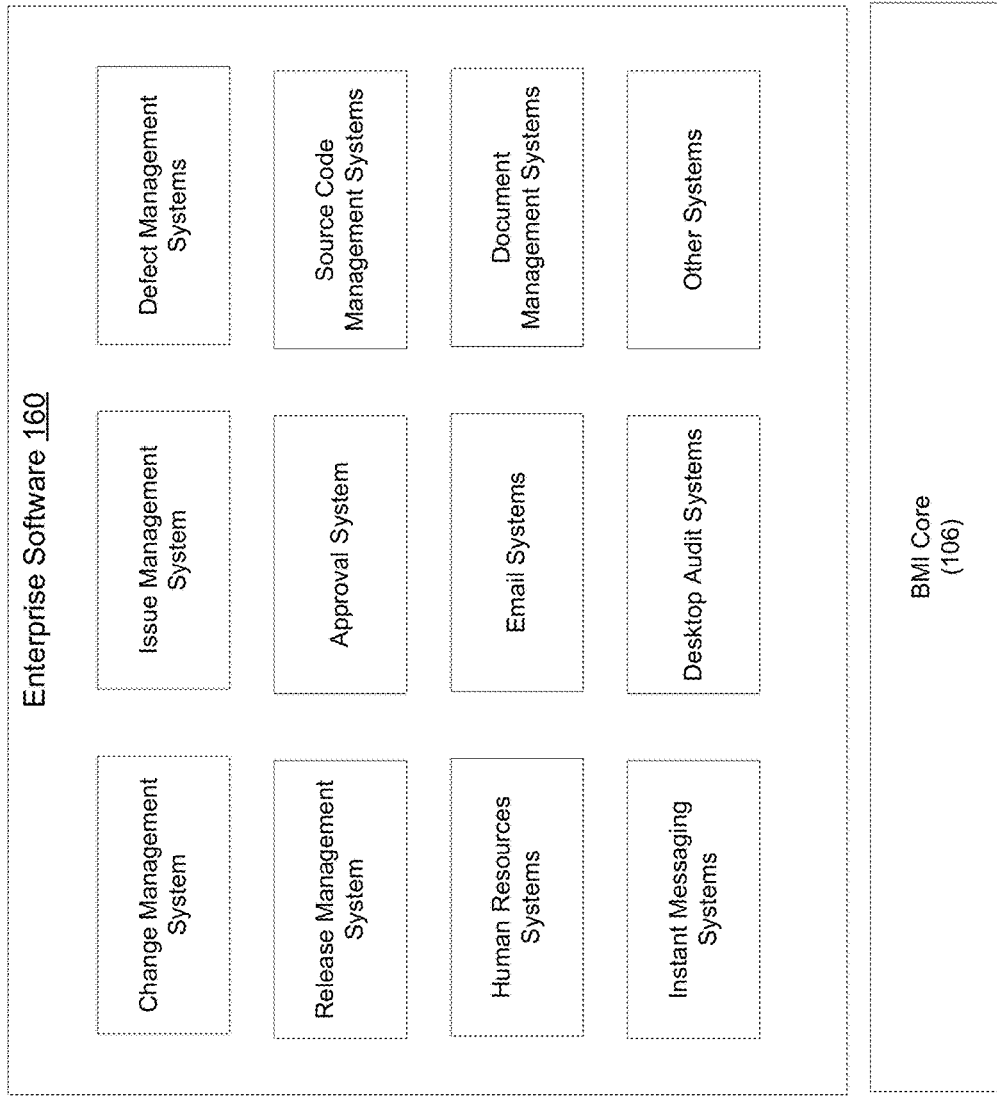
FIG. 2 depicts examples of various components of enterprise software according to one embodiment.

In one embodiment, enterprise software 160 include one or more program that may provide different components that may be used to track different efficiency metrics of an organization. For example, FIG. 2 depicts examples of various components of enterprise software 160, such as a change management system, an issue management system, a defect management system, a release management system, an approval system, a source code management system, a human resources (HR) system, an email system, a document storage system, an instant messaging system, a desktop audit system, and other systems such as a calendar or scheduler system. In one embodiment, a plurality of these components may be part of the same enterprise software 160. It should be recognized that these components are exemplary only and additional, different, or fewer components may be used as is necessary and/or desired.

Referring again to FIG. 1, the core 106 may receive data from one or more component of enterprise software 160, process it, and store it as source system data 105. The core 106 may extract data from enterprise software 106 using, for example, Amazon Machine Images (AMIs) or similar. Examples of data extracted from enterprise software 106 may include: (1) change management (e.g., how frequently application changes occur); (2) issue management (e.g., requests for changes to systems); (3) defect management (e.g., quality of product being created); (4) release management (e.g., time between releases in environments (development to quality assurance, quality assurance to user acceptance testing, user acceptance testing to production, etc.; (5) approval system (e.g., number of tickets raised); (7) source code management (e.g., number of commits for the application); (8) HR systems (e.g., information about teams and organization members); (9) email systems (e.g., calendar and email information for team distractions); (10) document storage system (e.g., number and type of documents team makes, such as presentations); (11) instant messaging systems (e.g., the number of times a day a team member is disrupted by messages); (12) desktop audit systems (e.g., what applications are used, the length of time used during the day, etc.); (12) approval system (e.g., the number of approvals needed to complete daily work); etc.

When extracting the data, the core 106 may also record how the extracted data relates to the organizations hierarchy 133. In other words, the core 106 may associate the extracted data with one or more individuals within the hierarchy so that the extracted data may be attributable to various hierarchical tiers.

FIG. 3 depicts an example of a GUI 154 rendered on a client device 152. A user may be presented with various types of data, such as efficiency metrics, for different bureaucracy categories, in GUI 154. Moreover, a user may view aggregated data for different tiers in the hierarchy. For example, a user may select a hierarchical tier, such as a line of business, a team, a functional group, or other sub-organization and view the aggregated data 104 for the selected tier. The GUI 154 may further present trends in efficiency metrics, changes in efficiency metrics over a specified period of time, etc. using, for example, a trend indicator such as an arrow, thermometer, etc. In one embodiment, a color may be used to indicate an amount of change in the trend, whether the trend is in a desired direction, etc.

The GUI 154 may also include a summary explaining the changes in efficiency metrics.

Referring again to FIG. 1, the simulator engine 124 may also be used to generate "what if" scenarios that may be modelled to determine the effect those scenarios would have on the organizational efficiency metrics. Example scenarios include reorganizations, replacement of key leadership, adding a new layer of management, moving teams between management layers, adding new team members, shifting teams to new locations, changing hardware/software, etc. For example, an organization 130 may simulate the effects of policies, such as a "no meeting Wednesday" policy or other organizational changes, on the efficiency metrics for different bureaucracy categories. Moreover, changes made to the organization 130 may be monitored or tracked according to changes in the data 104.

Embodiments may apply machine learning in order to generate insights and to create recommendations. The recommendations may be based on efficiency metrics for successful teams. In one embodiment, simulator engine 124 may perform a simulation to simulate the effect of making a change, such as a removing a management layer, etc.

Machine learning may also be used to compare an organization to one or more external competitors by mining data from publicly available data sources (e.g., LinkedIn, Facebook, other social media public disclosures) to infer efficiency metrics for competitors.

In one embodiment, the computing system 101 may automatically implementing policy changes by communicating with the enterprise software application 160. For example, the core 106 may send an instruction to a calendar application to block out specific times of a calendar to implement policies such as, for example "no meeting Wednesday."

Figure 4:
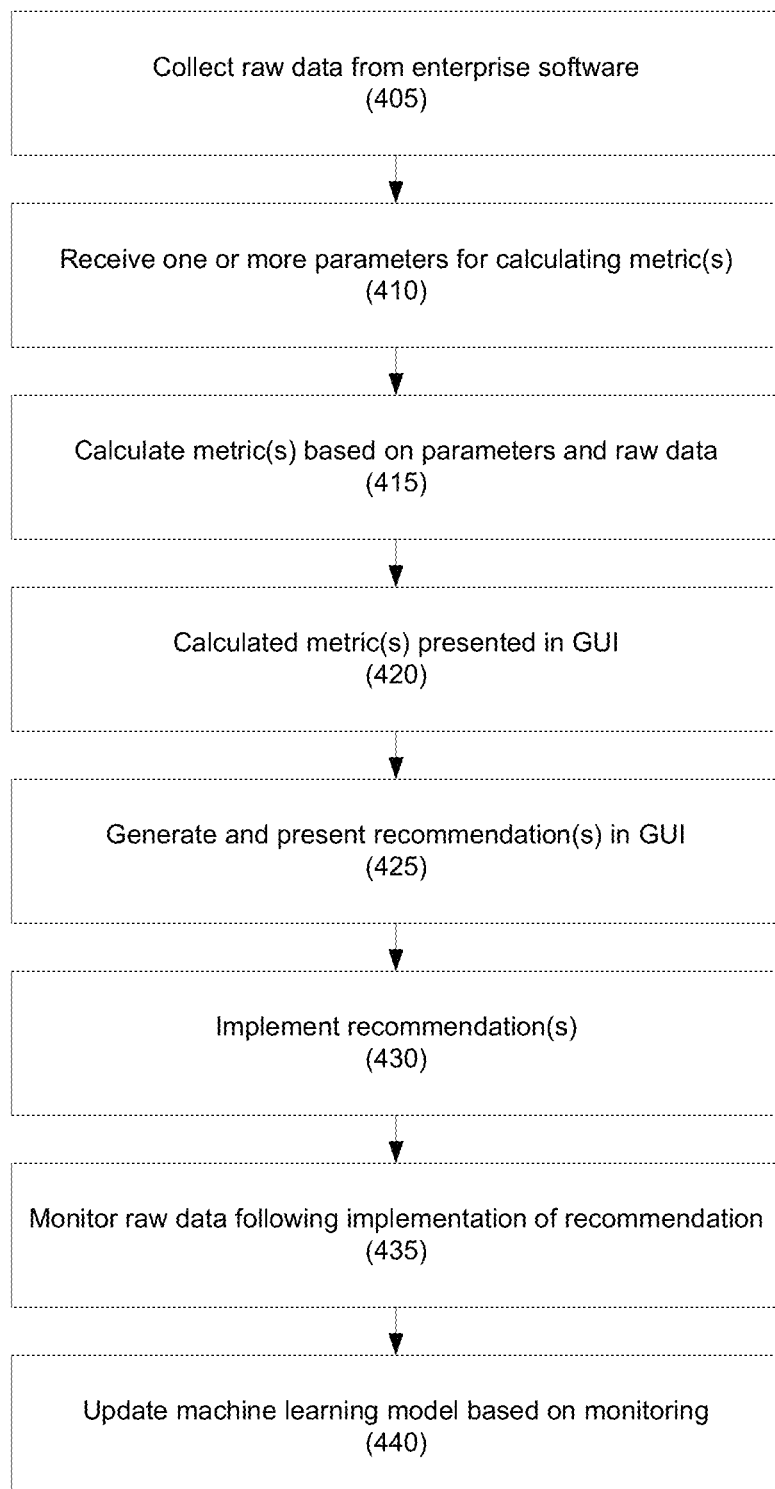
FIG. 4 depicts a method for determining the efficiency of an organization by analyzing data feeds from various applications according to one embodiment.

Referring to FIG. 4, a method for determining the efficiency of an organization by analyzing data feeds from various applications is disclosed according to an embodiment.

In step 405, a raw data may be retrieved from one or more enterprise software program. For example, raw data may be retrieved from enterprise software and/or enterprise software components, such as a change management system, an issue management system, a defect management system, a release management system, an approval system, a source code management system, a human resources (HR) system, an email system, a document storage system, an instant messaging system, a desktop audit system, and other systems such as a calendar or scheduler system.

Raw data collected may include, for example, number of direct reports for all managers; number of layers to the chief information officer; percentage of people on development teams versus headcount; a ratio of developers to non-developers; a number of HR requests raised, approved, or abandoned; the time to answer; a number of approvers; a number of different systems needed for approval; a number of hours spent in meetings; a number of hours of mandatory training; a number of manual tasks (e.g., time entry, testing, deployment; user surveys; a number of different systems accessed on a daily basis; time spent on productive versus nonproductive application; an amount of context switching between applications; a number of emails sent and received; a number of email group memberships; a number of inbound and outbound phone calls; team colocation (i.e., how far do members of the team sit from each other); a number of personal repositories; an amount of test coverage; a number of code commits; structural layouts; an amount of time spent managing approval queues; an amount of time spent meeting with team only; a percent of code written that duplicates code written by other teams; a number of layers between development team and end users; a percentage of the team that donate development time to local charities; a percentage of team involved in internal technology community engagement; a number of new invention disclosures generated by the team; a percentage of backlog spent of items that do not get completed; a percentage of backlog raised by developers; a percentage of team change over a period of time (e.g., 12 months); a percentage of management change over a period of time (e.g., 12 months); an average number of managers that team members have had over a period of time (e.g., 12 months); an amount of team growth over a period of time (e.g., 12 months); an age of technology components; a frequency of updates to technology components; an overall age of applications; a number of intellectual property disclosures or filings by teams; a number of meetings per workday; a frequency of organization hierarchy turnover; a tenure of organization hierarchy; etc. It should be noted that these are exemplary only and additional, fewer, and/or different types of raw data may be collected as is necessary and/or desired. The type of raw data collected may depend on the purpose of the team (e.g., coding development team versus legal team).

In one embodiment, the type and amount of raw data collected may depend on the efficiency metric being measured, the purpose of the team, etc.

In one embodiment, the raw data may be collected periodically by pulling the data from the enterprise software. In another embodiment, the data may be pushed from the enterprise software, an agent, etc. In still another embodiment, the data may be retrieved on demand, just before the efficiency metric calculations are run, etc.

In step 410, one or more parameter for calculating one or more efficiency metric may be received. For example, parameters such as a team identifier, team member, manager, organization, time period, etc. may be received from, for example, a user interface. In one embodiment, default parameters may be provided for each individual, and those default parameters may be modified as is necessary and/or desired.

In one embodiment, a specific efficiency metric to be calculated may be received with the parameters if fewer than the complete set of efficiency metrics are to be calculated.

In step 415, one or more efficiency metric may be calculated based on the parameters. In one embodiment, one or more efficiency metric calculation may be performed for efficiency metrics such as for disempowerment, bloat, politics, inertia, risk aversion, insularity, and friction may be calculated using one or more algorithms. For example, disempowerment may be calculated based on the number of personal repositories, whether developers are contributing to multiple repositories, level of test coverage, number of code commits, difficultly in testing the code, etc.

An illustrative disempowerment calculation is as follows:

$$\sum \left( \frac{\text{Number repositories}}{\frac{\text{Company Median}}{\text{Average Number Repositories}}} \right) \times \text{Metric Weight} +$$

$$\left( \frac{\text{Test Code Coverage}}{\frac{\text{Company Median}}{\text{Test Code Coverage}}} \right) \times \text{Metric Weight} +$$

$$\left( \frac{\text{Average Number of Commits per Developer}}{\frac{\text{Company Median}}{\text{Average Number of Commits per Developer}}} \right) \times \text{Metric Weight}$$

The bloat efficiency metric may be calculated based on, for example, the number of direct reports for all managers, the number of layers to the chief information officer, the percentage of people on development teams versus headcount, the ratio of developers to non-developers, etc.

An illustrative bloat calculation is as follows:

$$\sum \left( \frac{\text{Number of Direct Reports}}{\text{Company Median Average Number Direct Reports}} \right) \times \text{Metric Weight} +$$

$$\left( \frac{\text{Percentage of Developers}}{\text{Company Median Percentage of Developers}} \right) \times \text{Metric Weight} +$$

$$\left( \frac{\text{Number of Layers to CIO}}{\text{Company Median Average Number of Layers to CIO}} \right) \times \text{Metric Weight}$$

The friction efficiency metric may be calculated based on, for example, the number of HR request raised, approved, or abandoned, the time to answer, the number of approvers, the number of different systems needed for approval, the number hours spent in meetings, the hours of mandatory training, the number of manual tasks (e.g., time entry, testing, deployment; user surveys, the number of different systems accessed on a daily basis, the time spent on productive versus nonproductive applications, amount of context switching between applications, the number of emails sent and received, the number of email group memberships, the number of inbound and outbound phone calls, team colocation (i.e., how far do members of the team sit from each other), the use of feature branching, etc.

An illustrative friction calculation is as follows:

$$\sum \left( \frac{\text{Number of Emails}}{\text{Company Median Average Number Emails}} \right) \times \text{Metric Weight} +$$

$$\left( \frac{\text{SUm of time zone differences from GMT}}{\text{Company Median Time Zones from GMT}} \right) \times \text{Metric Weight} +$$

$$\left( \frac{\text{Average Number of 2hr coding blocks per developer per week}}{\text{Company Median Average Number of 2hr coding blocks per developer per week}} \right) \times \text{Metric Weight}$$

The politics efficiency metric may be based on, for example, the average tenure of team with manager, the number of new hires on the team, the number of meetings with peers (instead of business users or external teams), the time managers are spent meeting with their management, etc.

An illustrative politics calculation is as follows:

$$\sum \left( \frac{\text{Number of Meetings with Peers}}{\text{Company Median Average Number Meetings with Peers}} \right) \times \text{Metric Weight} +$$

$$\left( \frac{\text{Average Tenure with Manager}}{\text{Company Median Average Tenure with Manager}} \right) \times \text{Metric Weight} +$$

$$\left( \frac{\text{Number of Teams New Hires(90}d\text{)}}{\text{Average Number of Oraganization New Hires(90}d\text{)}} \right) \times \text{Metric Weight}$$

The inertia efficiency metric may be based on, for example, the percentage of team change in past 12 months (or any suitable time period), the percent of management change in last 12 months (or any suitable time period), the average number of managers that team members have had in the past 12 months (or any suitable time period), the amount of team growth in the past 12 months (or any suitable time period), etc.

An illustrative inertia calculation is as follows:

$$\sum \left( \frac{\text{Team Growth in last 12}mos}{\text{Company Median Average Team Growth in last 12 }mos} \right) \times \text{Metric Weight} +$$

$$\left( \frac{\text{Average number of team managers in last 12}mos}{\text{Company Median Average Number of Team Managers in last 12}mos} \right) \times \text{Metric Weight} +$$

$$\left( \frac{\text{Percentage of manager change in last 12}mos}{\text{Company Median Average Manager Change in last 12 }mos} \right) \times \text{Metric Weight}$$

The risk aversion efficiency metric may be a quantification of how likely it is for the team to try new things or to innovate. Risk aversion may be based on, for example, the age of the infrastructure, the age of the application components, the frequency in which the code modules are updated, and the overall age of the application. Older components, or technologies will generally have additional risk in modifying them. The coverage of automated unit and regression tests may provide some comfort that changes that break or impair the system will be detected prior to release. The overall age of the application may indicate how likely it is for teams to be comfortable changing the application. Team tenure and the age of an application may be considered, as a new team may be averse to working on an old application as the team may not be familiar with application, its growth over time, why it was constructed in specific ways, etc. The number of patent disclosures, applications filed, etc. may be indicative of the amount of innovation for a team, and its aversion to risk-taking.

An illustrative risk aversion calculation is as follows:

$$\sum \left( \frac{\text{Patent Disclosures in last } 12mos}{\text{Company Median Number Patent Disclosures in last } 12mos} \right) \times \text{Metric Weight} +$$

$$\left( \frac{\text{Average Age of Software Modules}}{\text{Company Median Average Age of Software Modules}} \right) \times \text{Metric Weight} +$$

$$\left( \frac{\text{Max days since last commit for any code modules}}{\text{Average Number of days since last commit for code modules}} \right) \times \text{Metric Weight}$$

The insularity efficiency metric may be based on the time spent managing approval queues; time spent meeting with team only, percent of code written that duplicates code written by other teams, number of layers between development team and end users; a percentage of team that donate development time to local charities; a percentage of the team involved in internal technology community engagement, number of new invention disclosures generated by the team, percent of backlog spent of items that do not get completed; percent of backlog raised by developers, etc.

An illustrative insularity calculation is as follows:

$$\sum \left( \frac{\text{Percentage of team involved in external charitable events}}{\text{Company Mediam Percentage of team involved in external charitable events}} \right) \times \text{Metric Weight} +$$

$$\left( \frac{\text{Percentage of team involved in location events}}{\text{Company Median Percentage of team involved in location events}} \right) \times \text{Metric Weight} +$$

$$\left( \frac{\text{Number of layers between developers and users}}{\text{Company Median Number of layers between developers and users}} \right) \times \text{Metric Weight}$$

Each factor in the above efficiency metric calculations may be assigned a weight, which may be used to produce the desired efficiency metric. In one embodiment, the weightings may be manually assigned, may be based on machine learning, etc.

In embodiments, weightings may also be applied to one or more of the efficiency metrics. For example, each efficiency metric may have a baseline, a 90-day trend, and an expectation. The difference between the current efficiency metric value and the expected efficiency metric value may be multiplied by the weight to generate a normalized weighting.

In one embodiment, each weighting may be configurable by a human, based on machine learning, etc. For example, if risk aversion is a good indicator of inefficiency, while bloat is not, risk aversion may be given a higher weighting than bloat. The weightings may vary by team, location, time period, etc.

In step 420, the calculated efficiency metrics may be presented to the user via a GUI. In one embodiment, because in the abstract the efficiency metric may not mean anything, the efficiency metric may be presented and compared to a efficiency metric for a similarly situated individual, team, or organization.

In one embodiment, if the efficiency metrics have been calculated before, changes from a prior efficiency metric and or trends from multiple efficiency metrics may be presented. In one embodiment, an explanation for the change may be provided. For example, if the efficiency metric for politics increased, and the reason for the increase was a large amount of turnover, this explanation may be provided.

In one embodiment, the changes, trends, etc. may be presented graphically using icons, colors, meters, and/or text as is necessary and/or desired.

In step 425, one or more recommendation may be presented based on the efficiency metric. For example, if the friction efficiency metric was high compared to that of other individuals, teams, or organizations, a recommendation to decrease the number of meetings, to use or change a parameter for email filtering/prioritization software, etc. may be provided. If the risk aversion efficiency metric was high, recommendations to update system software, to order new hardware to replace aging hardware, etc. may be provided.

In one embodiment, the recommendation may be identified using a trained machine learning model based on historical data for the entity, historical data from a different entity, inferred metrics, etc.

In step 430, the one or more recommendation may be automatically implemented. For example, the core may interface with the enterprise software to limit the number of hours of meetings in a day, to change an email filtering parameter, to automatically update software, to queue new hardware to order, etc.

In another embodiment, the recommendation(s) may be manually implemented.

In step 435, the result of the actions taken may be monitored, and in step 440, a machine learning model may be updated with the monitored results. For example, if the action implemented was to reduce the number of meetings, and the friction efficiency metric did not significantly change, the weighting for that factor may be reduced. Conversely, if new hardware was ordered and integrated, and the risk aversion efficiency metric decreased, then the weighting for the new hardware factor may increase.

In embodiments, the weightings may be modified based on the successes and failures of the implemented actions. Once a recommended action is implemented, the impact on the score for one or more efficiency metric may be monitored, which may inform the system of what recommended action work and how well they work. In one embodiment, a machine learning model may be trained based on these results. Thus, based on this history, the system may provide the recommended action that it predicts to have the greatest impact.

Figure 5:
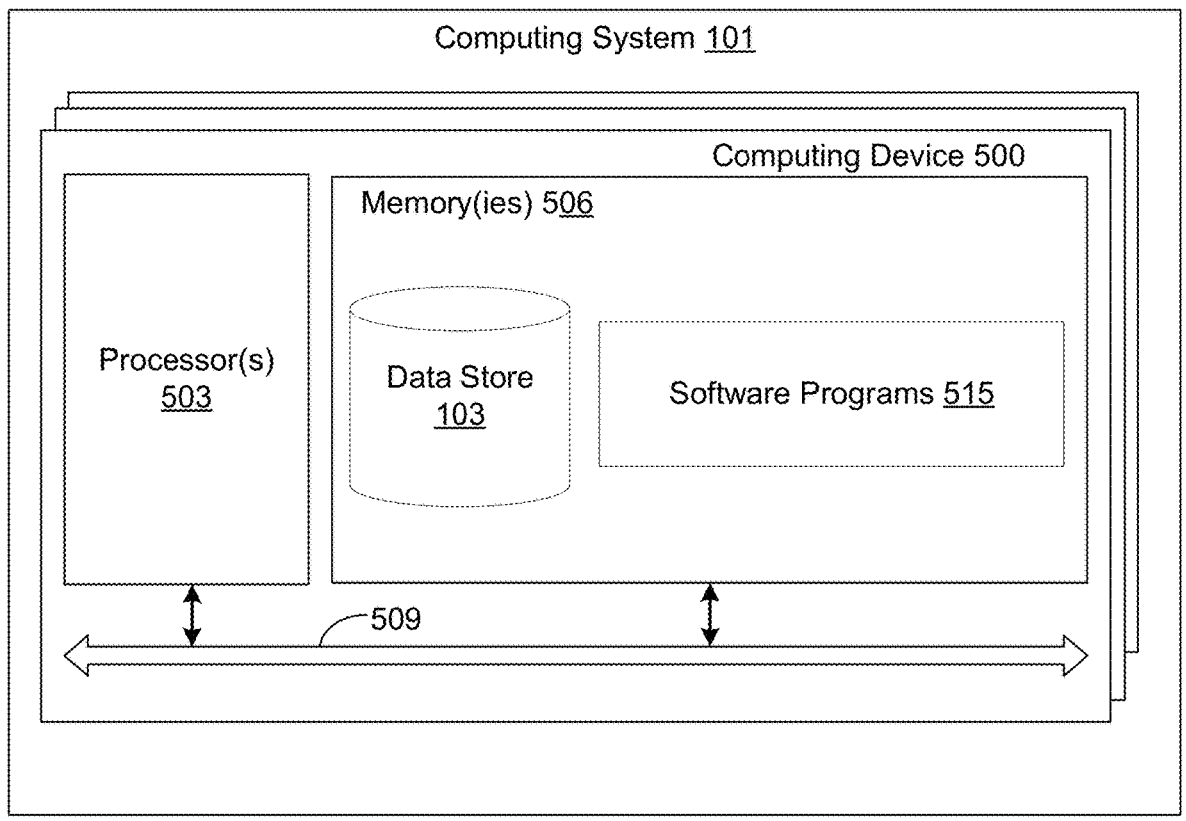
FIG. 5 depicts a schematic block diagram of a computing system according to one embodiment.

FIG. 5 is a schematic block diagram that provides one example illustration of a computing system 101 of FIG. 1 according to some embodiments. The computing system 101 may include one or more computing devices 500. Each computing device 500 may include at least one processor circuit, for example, having a processor 503 and memory 506, both of which may be coupled to a local interface 509 or bus. Each computing device 500 may include at least one server computer or like device. The local interface 509 may include a data bus with an accompanying address/control bus or other bus structure.

Data and several components may be stored in memory 506. The data and several components may be accessed and/or executable by the processor 503. Software programs 515 may be stored in memory 506 and executed by the processor 503. Data store 103 and other data may be stored in memory 506. An operating system may be stored in memory 506 and executable by processor 503.

Other applications may be stored in memory 506 and may be executable by processor 503. Any component discussed herein may be implemented in the form of software, any one of a number of programming languages may be employed, for example, C, C++, C #, Objective C, Java®, JavaScript®, Perl, PHP, Visual Basic®, Python®, Ruby, or other programming languages.

Several software components may be stored in memory 506 and may be executable by processor 503. The term "executable" may be described as a program file that is in a form that can ultimately be run by processor 503. Examples of executable programs may include a compiled program that may be translated into machine code in a format that may be loaded into a random access portion of memory 506 and run by processor 503, source code that may be expressed in proper format such as object code that is capable of being loaded into a random access portion of memory 506 and executed by processor 503, or source code that may be interpreted by another executable program to generate instructions in a random access portion of memory 506 to be executed by processor 503, and the like. An executable program may be stored in any portion or component of memory 506, for example, random access memory (RAM), read-only memory (ROM), hard drive, solid-state drive, USB flash drive, memory card, optical disc such as compact disc (CD) or digital versatile disc (DVD), floppy disk, magnetic tape, or any other memory components.

The memory 506 may be defined as including both volatile and nonvolatile memory and data storage components. Volatile components may be those that do not retain data values upon loss of power. Nonvolatile components may be those that retain data upon a loss of power. Memory 506 can comprise random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. Embodiments, RANI can comprise static random-access memory (SRAM), dynamic random access memory (DRAM), or magnetic random access memory (MRAM) and other such devices. Embodiments, ROM can comprise a programmable read-only memory (PROM), an erasable programmable read-only memory (EPROM), an electrically erasable programmable read-only memory (EEPROM), or other like memory device.

The processor 503 can represent multiple processors 503 and/or multiple processor cores and memory 506 can represent multiple memories 506 that can operate in parallel processing circuits, respectively. The local interface 509 may be an appropriate network that facilitates communication between any two of the multiple processors 503, between any processor 503 and any of the memories 506, or between any two of the memories 506, and the like. The local interface 509 can comprise additional systems designed to coordinate this communication, for example, performing load balancing. The processor 503 may be of electrical or other available construction.

The memory 506 stores various software programs 515 such as, for example, a core 106, a portal 109, a reporting application program interface (API) 112, a model API 115, a machine learning module 118, a reporting and analytics module 121, and a simulator engine 125. These software programs 515 may be embodied in software or code executed by hardware as discussed above, as an alternative the same can also be embodied in dedicated hardware or a combination of software/hardware and dedicated hardware. If embodied in dedicated hardware, each may be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, and the like. Technologies can generally be well known by those skilled in the art and, consequently, are not described in detail herein.

The operations described herein may be implemented as software stored in computer-readable medium. Computer-readable medium can comprise many physical media, for example, magnetic, optical, or semiconductor media. Examples of a suitable computer-readable medium can include, but are not limited to, magnetic tapes, magnetic floppy diskettes, magnetic hard drives, memory cards, solid-state drives, USB flash drives, or optical discs. Embodiments, computer-readable medium may be a random-access memory (RAM), for example, static random-access memory (SRAM) and dynamic random access memory (DRAM), or magnetic random access memory (MRAM). Computer-readable medium may be a read-only memory (ROM), a programmable read-only memory (PROM), an erasable programmable read-only memory (EPROM), an electrically erasable programmable read-only memory (EEPROM), or other type of memory device.

Any logic or application described herein, including the software programs 515 may be implemented and structured in a variety of ways. One or more applications described may be implemented as modules or components of a single application. One or more applications described herein may be executed in shared or separate computing devices or a combination thereof. For example, the software application described herein can execute in the same computing device 500, or in multiple computing devices in the same computing system 101. Additionally, it is understood that terms such as "application," "service," "system," "engine," "module," and so on may be interchangeable and are not intended to be limiting.

Disjunctive language such as the phrase "at least one of X, Y, or Z," unless specifically stated, is otherwise understood with the context as used in general to present that an item, term, and the like, may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for measuring efficiency, comprising:
   in an information processing apparatus comprising at least one computer processor:
   receiving, from an enterprise software program, raw data related to an entity's performance;
   determining, from the raw data, a first numeric parameter and a second numeric parameter, wherein:
   the first numeric parameter is derived from a metric measured by an organization;
   the first numeric parameter measures the metric with respect to the entity;
   the second numeric parameter is derived from the metric; and
   the second numeric parameter measures a median value of the metric across a plurality of entities of the organization;
   calculating an efficiency metric based on the first numeric parameter, the second numeric parameter, and a metric weight, wherein the calculating includes dividing the second numeric parameter into the first numeric parameter to arrive at a first quotient, and multiplying the first quotient by the metric weight;
   training a machine learning model using historical data for the entity;
   identifying a recommended action based on the efficiency metric via the machine learning model, wherein the recommended action comprises updating system software and the enterprise software program is configured to automatically update the system software;
   monitoring a change in the efficiency metric in response to the implementation, the change based on a relative success or failure of the implementation; and
   further training the machine learning model based on the monitored change in the efficiency metric and the recommended action.

2. The method of claim 1, wherein the efficiency metric comprises at least one of a disempowerment efficiency metric, a bloat efficiency metric, a politics efficiency metric, an inertia efficiency metric, a risk aversion efficiency metric, an insularity efficiency metric, and a friction efficiency metric.

3. The method of claim 1, further comprising:
   graphically presenting at least one of the efficiency metrics with a trend indicator based on at least a prior efficiency metric.

4. The method of claim 3, wherein the trend indicator comprises an arrow.

5. The method of claim 1, further comprising:
   graphically presenting at least one of the efficiency metrics with a comparison to an efficiency metric for a similarly situated entity.

6. The method of claim 1, wherein the raw data comprises at least one of a number of direct reports for managers, a number of approvers in an approval chain, an average tenure for a manager, an amount of personnel change, an age of hardware infrastructure, and an amount of time spent on internal meetings.

7. The method of claim 1, wherein the recommended action further comprises limiting a number of meetings.

8. The method of claim 1, wherein the recommended action further comprises updating hardware infrastructure.

9. The method of claim 1, wherein the recommended action further comprises changing an email filtering parameter.

10. The method of claim 1, further comprising:
    receiving, from the enterprise software program, updated raw data related to the entity's performance following the implementation of the recommended action;
    re-calculating the efficiency metric; and
    updating a recommended action database based on the recommended action and the calculated and re-calculated efficiency metric.

11. The method of claim 1, wherein the enterprise software program comprises an approval system, a human resources (HR) system, an email system, a document storage system, and a calendar or scheduler system.

12. The method of claim 1, further comprising:
    generating hypothetical raw data for a hypothetical change;
    calculating a hypothetical efficiency metric based on the hypothetical change; and
    graphically presenting the efficiency metric and the hypothetical efficiency metric.

13. A system for measuring efficiency, comprising:
at least one computer including a processor and executing a computer program, wherein when executed by the processor, the computer program causes the computer to:
receive, from an enterprise software program, raw data related to an entity's performance;
determine, from the raw data a first numeric parameter and a second numeric parameter, wherein:
the first numeric parameter is derived from a metric measured by an organization;
the first numeric parameter measures the metric with respect to the entity;
the second numeric parameter is derived from the metric, and;
the second numeric parameter measures a median value of the metric across a plurality of entities of the organization;
calculate an efficiency metric based on the first numeric parameter, the second numeric parameter, and a metric weight, wherein the calculating includes dividing the second numeric parameter into the first numeric parameter to arrive at a first quotient, and multiplying the first quotient by the metric weight, wherein the efficiency metrics comprise at least one of a disempowerment efficiency metric, a bloat efficiency metric, a politics efficiency metric, an inertia efficiency metric, a risk aversion efficiency metric, an insularity efficiency metric, and a friction efficiency metric;
train a machine learning model using historical data for the entity;
identify a recommended action based on the efficiency metric via the machine learning model, wherein the recommended action comprises updating system software and the enterprise software program is configured to automatically update the system software;
monitor a change in the efficiency metric in response to the implementation, the change based on a relative success or failure of the implementation; and
further train the machine learning model based on the monitored change in the efficiency metric and the recommended action.

14. The system of claim 13, wherein the computer program outputs a graphical representation of the efficiency metric with a trend indicator based on at least a prior efficiency metric.

15. The system of claim 13, wherein the enterprise software program comprises an approval system, a human resources (HR) system, an email system, a document storage system, and a calendar or scheduler system.

* * * * *